(12) United States Patent
Zanini

(10) Patent No.: US 10,518,810 B2
(45) Date of Patent: Dec. 31, 2019

(54) CHASSIS FOR SELF-PROPELLED OPERATING MACHINES

(71) Applicant: MULTIONE SRL, Grumolo delle Abbadesse (IT)

(72) Inventor: Stefano Zanini, Grumolo delle Abbadesse (IT)

(73) Assignee: MULTIONE SRL, Grumolo, Delle (IT)

( * ) Notice: Subject to any disclaimer, the term of this patent is extended or adjusted under 35 U.S.C. 154(b) by 19 days.

(21) Appl. No.: 15/639,746

(22) Filed: Jun. 30, 2017

(65) Prior Publication Data

US 2018/0001932 A1 Jan. 4, 2018

(30) Foreign Application Priority Data

Jul. 4, 2016 (IT) .......................... 102016000068973

(51) Int. Cl.
| | | |
|---|---|---|
| *B62D 21/11* | (2006.01) | |
| *B62D 21/18* | (2006.01) | |
| *B62D 49/06* | (2006.01) | |

(52) U.S. Cl.
CPC ............ *B62D 21/11* (2013.01); *B62D 21/186* (2013.01); *B62D 49/0621* (2013.01)

(58) Field of Classification Search
CPC ..... B62D 21/11; B62D 21/86; B62D 49/0621
See application file for complete search history.

(56) References Cited

U.S. PATENT DOCUMENTS

| | | | | |
|---|---|---|---|---|
| 2,701,728 A | * | 2/1955 | Miller .................. | B62D 49/085 180/313 |
| 3,032,352 A | * | 5/1962 | Barrett ................. | B62D 49/085 180/900 |
| 3,595,410 A | * | 7/1971 | Lemmon .............. | B62D 49/085 280/755 |
| 3,700,256 A | * | 10/1972 | Jones, Jr. ........... | B62D 49/0628 180/68.4 |
| 3,822,073 A | * | 7/1974 | Sieren .................. | B62D 49/085 280/760 |
| 4,087,101 A | | 5/1978 | Shimazaki et al. | |
| 4,232,883 A | * | 11/1980 | Bourgeous ........... | B62D 49/085 280/759 |
| 4,403,671 A | * | 9/1983 | Schmahl .............. | A01B 59/048 180/233 |
| 4,664,404 A | * | 5/1987 | Schultz ................ | B62D 49/085 172/611 |
| 4,690,183 A | * | 9/1987 | Eilertson .............. | A01G 23/067 144/24.12 |

(Continued)

FOREIGN PATENT DOCUMENTS

| | | |
|---|---|---|
| GB | 1329805 | 9/1973 |
| GB | 2120987 B | 11/1985 |

(Continued)

*Primary Examiner* — Faye M Fleming
(74) *Attorney, Agent, or Firm* — R. Neil Sudol; Henry D. Coleman

(57) ABSTRACT

A chassis, particularly for self-propelled operating machines, has a frame adapted to support a motorized movement means and a control means of an operating machine. The particularity of the present invention resides in that it comprises at least one ballast member adapted to support mechanical parts of the operating machine, which is an integral part of the frame.

4 Claims, 2 Drawing Sheets

(56) References Cited

U.S. PATENT DOCUMENTS

| | | | | |
|---|---|---|---|---|
| 4,736,633 A | * | 4/1988 | Duppong | B66C 1/447 |
| | | | | 73/826 |
| D436,969 S | * | 1/2001 | Moehle | D15/28 |
| 6,880,854 B2 | * | 4/2005 | Powell | B62D 49/085 |
| | | | | 280/755 |
| 8,662,460 B2 | * | 3/2014 | Heimbuch | B62D 49/085 |
| | | | | 212/178 |
| 2013/0026789 A1 | | 1/2013 | Schott et al. | |
| 2018/0186207 A1 | * | 7/2018 | Fay, II | B60G 17/016 |

FOREIGN PATENT DOCUMENTS

| | | | | |
|---|---|---|---|---|
| SU | 1169559 A | * | 7/1985 | A01D 46/04 |
| WO | 81/03154 | | 11/1981 | |

* cited by examiner

CHASSIS FOR SELF-PROPELLED OPERATING MACHINES

The present invention relates to a chassis for self-propelled operating machines.

As is known, the loadbearing structure of self-propelled operating machines, like that of other vehicles, is constituted by a chassis that determines its shape and defines the position of the parts required by the machines.

In general, a chassis is formed by strong metallic profiled members which are mutually connected so as to constitute a single resisting assembly, to which the engine, the body, the axle shafts and any work equipment are fixed.

WO81/03154 discloses an aircraft tug having an equipment support frame in the form of a heavy base plate carried, beneath an operator's station portion of a conventional tractor chassis, and a pair of transversely spaced struts secured to the front portion of the base plate and arranged to extend forwardly thereof. The front ends of the struts have attachment means for the support of equipment, such as a towing hitch, at the front of the tractor. First and second attachment means are provided for respectively securing the base plate and struts to the chassis.

GB2120987 discloses a farm tractor having an engine placed above the front axle and a gearbox fitted in the rear part of the tractor; a fuel tank is fitted between the engine and the gearbox over a substantial proportion of the length of the tractor. The fuel tank comprises a box-girder shaped carrying component of the tractor frame.

However, with particular reference to operating machines, it can be noted that the chassis may actually assume very different shapes than the one described above: for example, many operating machines are provided with a frame that is constituted by a front part and a rear part, which are mutually articulated by articulation systems.

In the case of operating machines designed to support work equipment, the chassis is considerably strengthened and in some cases is also ballasted.

When the machines are assigned to lifting loads or are equipped with particularly heavy work tools, removable ballast members, usually constituted by cement blocks, are in fact usually attached to the chassis.

The aim of the ballast members is obviously to rebalance the weights involved in order to avoid the possible tipping of the machine.

In this last regard, however, it is important to note that the choice to attach counterweights to the chassis or not, and how many to optionally attach, is often entrusted to the experience and professionalism of the operator, with the less than remote possibility that the choices made might be less than optimum.

In addition to this, one should consider that in general the coupling points for the ballast members are provided in positions that are significantly higher than the axle shafts and this causes a rise in the center of gravity of the machine.

The aim of the invention is to solve the problems described above, providing a chassis, particularly for self-propelled operating machines, that allows to lower the center of gravity of the operating machine that uses it, so as to increase the stability of the machine itself even during load lifting.

Within the scope of this aim, a particular object of the invention is to provide a chassis in which the arrangement of the counterweights is not entrusted exclusively to the expertize of the operator.

Another object of the invention is to provide a chassis that is capable of minimizing the vibrations produced by the engine.

A further object of the invention is to provide a chassis composed of a reduce number of parts, with consequent savings both in economic terms and in terms of assembly time.

This aim, as well as these and other objects which will become better apparent hereinafter, are achieved by a chassis, for self-propelled operating machines, comprising a frame adapted to support a motorized movement means, a control means of an operating machine, at least one ballast member adapted to support mechanical parts of said operating machine; said ballast member being an integral part of said frame.

Further characteristics and advantages will become better apparent from the description of a preferred but not exclusive embodiment of a chassis according to the invention, illustrated by way of nonlimiting example in the accompanying drawings, wherein.

Figure 1:
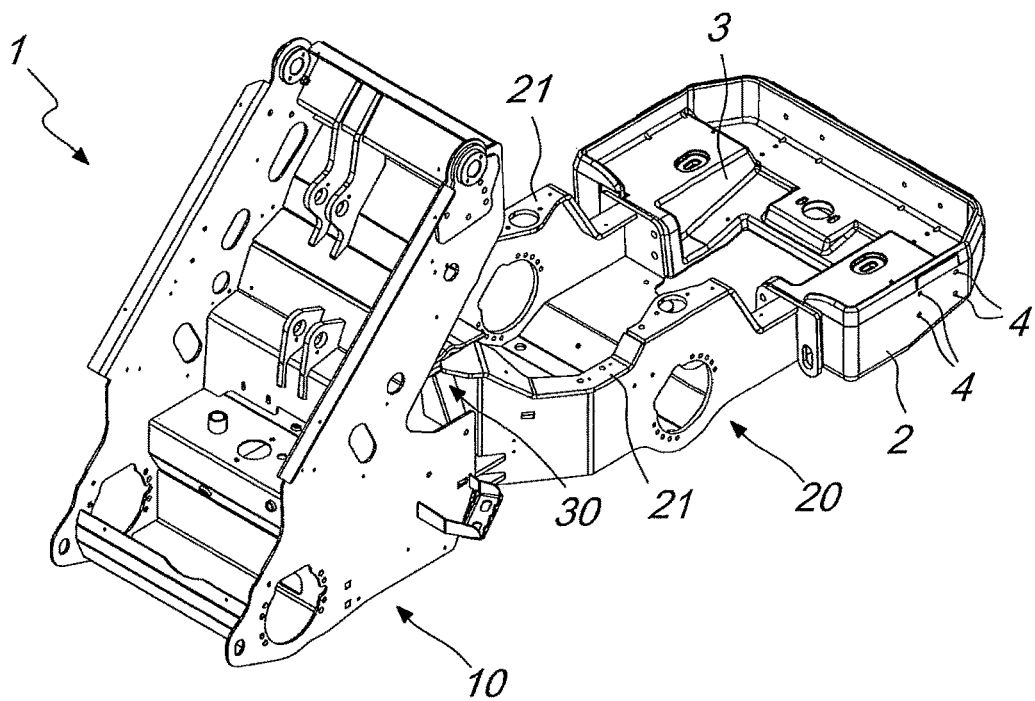
FIG. 1 is a perspective view of a chassis according to the invention.
Figure 2:
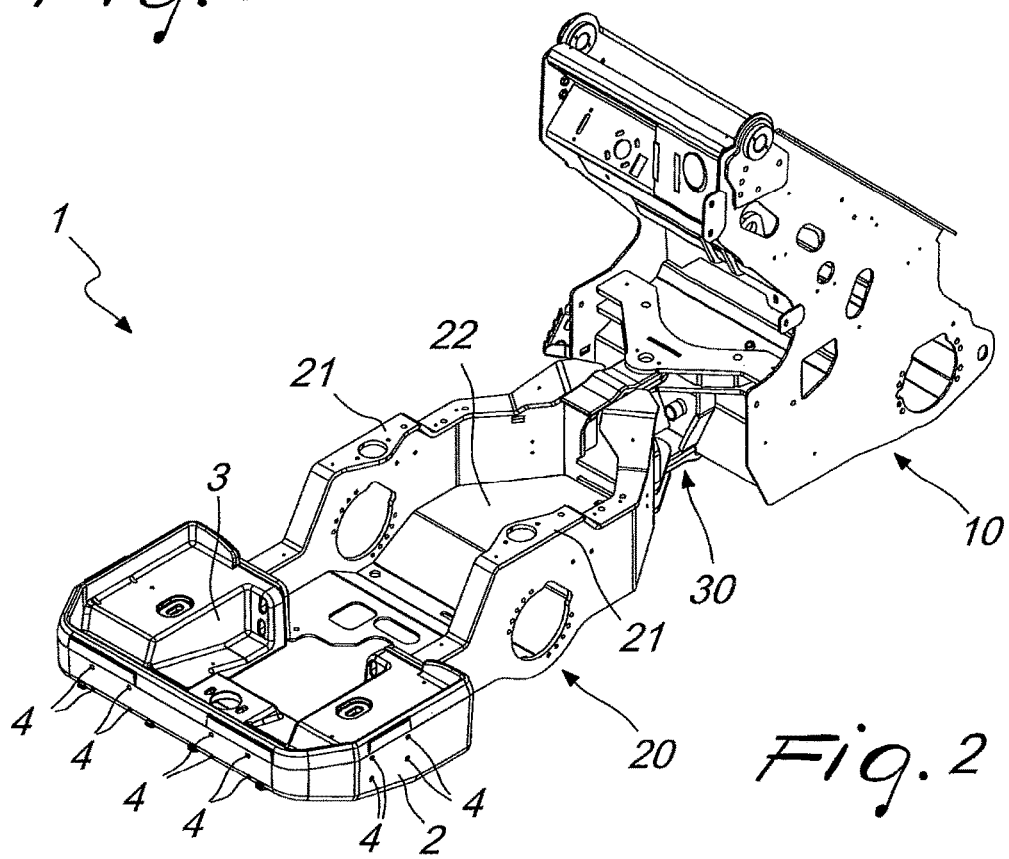
FIG. 2 is another perspective view of the chassis according to the invention.
Figure 3:
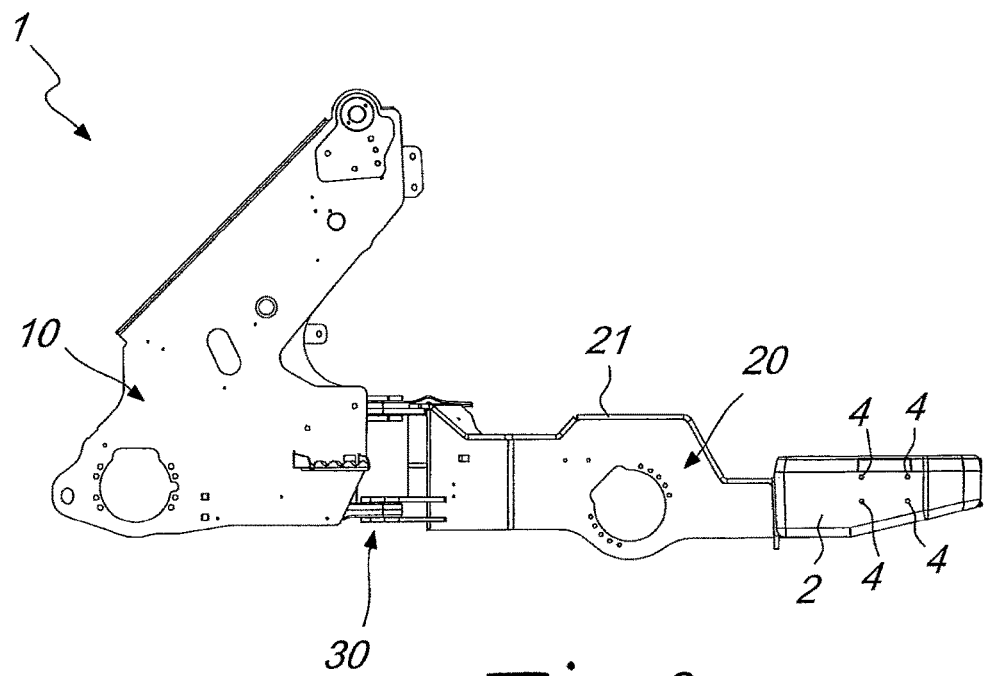
FIG. 3 is a side view of the chassis according to the invention.
Figure 4:
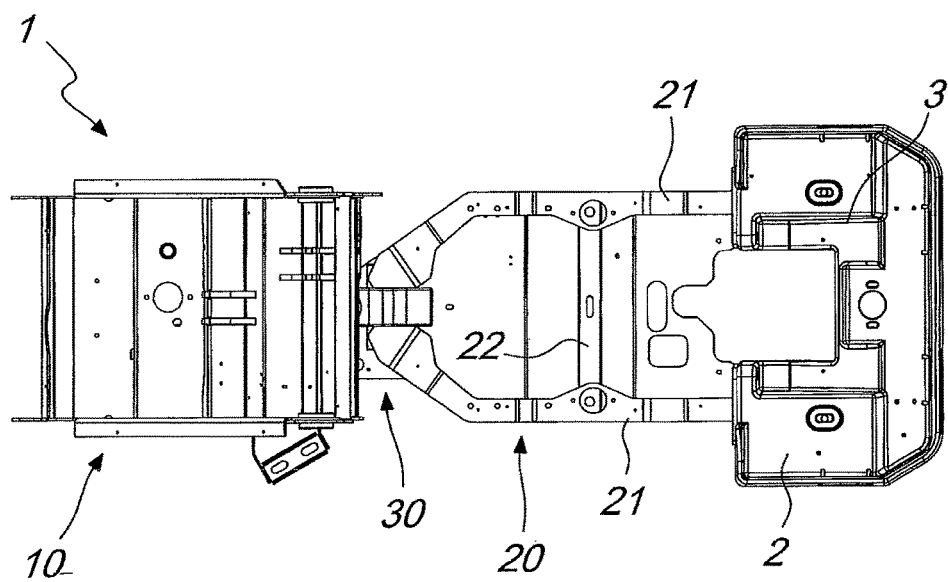
FIG. 4 is a top view of the chassis according to the invention.

With reference to the cited figures, the chassis, particularly for self-propelled operating machines, according to the invention, globally designated by the reference numeral 1, includes a frame which is adapted to support a motorized movement means and a means for the control of an operating machine, which may be of a per se known type and are not shown in the figures.

For example, the movement means may be constituted by wheels or tracks which are associated with the frame and are actuated by hydraulic motors controlled by a hydraulic pump.

The hydraulic pump may be actuated by a motor means, such as an internal combustion engine or by an electric motor.

The movement means interacts with a steering system which, together with the controls for the actuation of the hydraulic motors, constitutes the means for the control of the operating machine.

It is evident to the person skilled in the art that the movement means and the control means of the operating machine may also have configurations that are different from the ones described above.

According to the present invention, the frame has a front part 10, which is designed to support one or more work tools, and a rear part 20; the front part 10 and the rear part 20 mutually articulated by an articulation means 30.

The rear part 20 has a pair of longitudinal members 21 which are mutually rigidly connected by means of a reinforcement deck 22 which is arranged transversely.

According to the present invention, the chassis 1 includes a ballast member 2, which becomes an integral part of the frame and is adapted to support mechanical parts of the operating machine.

The ballast member 2 is composed of a single part which is joined to the rear part 20 of the frame by an adapted fastening means.

The ballast member 2 is joined directly to the frame and is arranged to the rear at a height from the ground that substantially matches the height of the axle shafts of the operating machine, allowing to lower the center of gravity of the operating machine as close as possible to the ground.

This evidently provides considerable benefits, especially if the machine is assigned to lifting loads or equipped with particularly heavy tools.

The ballast member 2 is preferably made of metal and is substantially C-shaped, so that the ends of the C can be joined to the ends of the longitudinal members 21 that are opposite to the ones joined to the articulation means 30.

A substantially concave seat 3 is provided on the ballast member 2 and is designed to accommodate the motor means.

In practice, the engine or a part thereof is accommodated in the seat 3 and is connected to the ballast member 2 with the interposition of silent blocks, i.e., rubber pads which support the engine and absorb vibrations.

The inertia of the ballast member 2 allows to effectively contrast the vibration generated by the engine.

Advantageously, the ballast member 2 is also provided with coupling portions and members which are constituted, in this embodiment, by threaded holes 4 which allow to integrate auxiliary components in the chassis 1, such as for example tow hooks, additional counterweights, or other components already used in chassis with known technology.

From what has been described above it is evident that the method of use of a chassis according to the invention substantially follows that of chassis of the known type; however, it should be noted that the integration of the ballast member in the frame entails considerable advantages in terms of reduction of the number of parts, and this leads for example to an acceleration of the manufacturing process of the machine.

Therefore, in practice it has been found that the invention fully achieves the intended aim and in particular the fact is stressed that the chassis according to the invention, by virtue of the presence of a ballast member which becomes an active and constructive part of the frame, as well as the particular arrangement of the member, is capable of lowering the center of gravity of the operating machine that uses it, thus increasing the stability of the machine even during load lifting.

It should also be noted that, since the engine of the operating machine is at least partly supported by the ballast member, the inertia of the ballast member allows to effectively contrast the vibrations generated by the engine.

This application claims the priority of Italian Patent Application No. UA2016A004879 (corresponding to 102016000068973), filed on Jul. 4, 2016, the subject matter of which is incorporated herein by reference.

The invention claimed is:

1. A chassis, for self-propelled operating machines, comprising:
   a frame adapted to support a motorized movement means including wheels or tracks and at least one motor, and a control means including a steering system; and
   at least one ballast member adapted to support mechanical parts of said operating machine, said ballast member being an integral part of said frame, said ballast member being substantially C-shaped,
   wherein said ballast member comprises at least one seat for receiving and at least partially supporting said at least one motor.

2. The chassis according to claim 1, wherein said ballast member is monolithic and fastened or joined to said frame.

3. A chassis, for self-propelled operating machines, comprising:
   a frame adapted to support a motorized movement means including wheels or tracks and at least one motor, and a control means including a steering system; and
   at least one ballast member adapted to support mechanical parts of said operating machine, said ballast member being an integral part of said frame, said ballast member being substantially C-shaped,
   wherein:
   said frame comprises at least one front part and at least one rear part articulated to one another;
   said ballast member is joined or fastened to said rear part; and
   said rear part comprises at least one pair of longitudinal members which are rigidly connected to each other by one or more transverse reinforcement members, said ballast member being joined to the ends of said longitudinal members.

4. The chassis according to claim 1, wherein said ballast member is arranged at a height above the ground that substantially corresponds to the height of axle shafts of said operating machine.

* * * * *